US008665283B1

United States Patent
Lim

(10) Patent No.: US 8,665,283 B1
(45) Date of Patent: Mar. 4, 2014

(54) METHOD TO TRANSFER IMAGE DATA BETWEEN ARBITRARILY OVERLAPPING AREAS OF MEMORY

(75) Inventor: Melvyn Lim, Brisbane, CA (US)

(73) Assignee: Ambarella, Inc., Santa Clara, CA (US)

( * ) Notice: Subject to any disclaimer, the term of this patent is extended or adjusted under 35 U.S.C. 154(b) by 967 days.

(21) Appl. No.: 12/748,668

(22) Filed: Mar. 29, 2010

(51) Int. Cl.
*G06F 13/00* (2006.01)
*G06F 12/02* (2006.01)
*G06F 15/167* (2006.01)

(52) U.S. Cl.
USPC ........... 345/537; 345/536; 345/538; 345/539; 345/540; 345/541; 345/542; 345/543; 345/544; 382/305; 711/147; 711/148; 711/149; 711/150; 711/151; 711/152; 711/153

(58) Field of Classification Search
USPC ............ 345/536–544; 382/305; 711/147–153
See application file for complete search history.

(56) References Cited

U.S. PATENT DOCUMENTS

| | | | | |
|---|---|---|---|---|
| 4,790,025 A | * | 12/1988 | Inoue et al. | 382/293 |
| 6,785,743 B1 | * | 8/2004 | Sun et al. | 710/4 |
| 7,495,669 B2 | * | 2/2009 | Ushida et al. | 345/537 |
| 7,870,610 B1 | * | 1/2011 | Mitchell et al. | 726/23 |
| RE43,565 E | * | 8/2012 | Lee | 345/535 |
| 2002/0118204 A1 | * | 8/2002 | Aleksic et al. | 345/544 |
| 2005/0007375 A1 | * | 1/2005 | Yi | 345/537 |
| 2006/0119602 A1 | * | 6/2006 | Fisher et al. | 345/441 |
| 2010/0039437 A1 | * | 2/2010 | Kobayashi et al. | 345/545 |

\* cited by examiner

*Primary Examiner* — Xiao M. Wu
*Assistant Examiner* — Todd Buttram
(74) *Attorney, Agent, or Firm* — Christopher P. Maiorana, PC

(57) ABSTRACT

An apparatus including a first memory, a second memory, and a memory interface. The first memory may be configured to store an entire image. The second memory may be configured to store a portion of the image during an image processing operation. The memory interface may be configured to transfer the portion of the image (i) from a source area of the first memory to the second memory prior to the image processing operation and (ii) from the second memory to a destination area of the first memory following the image processing operation. The memory interface may be further configured to select from among four modes of transferring image data from the source area of the first memory and to the destination area of the first memory based upon how the source area and the destination area overlap in the first memory.

18 Claims, 6 Drawing Sheets

US 8,665,283 B1

METHOD TO TRANSFER IMAGE DATA BETWEEN ARBITRARILY OVERLAPPING AREAS OF MEMORY

FIELD OF THE INVENTION

The present invention relates to a method and/or architecture for image processing generally and, more particularly, to a method and/or architecture to transfer image data between arbitrarily overlapping areas of memory.

BACKGROUND OF THE INVENTION

The conventional method of transferring image data from a source area to a destination area in a memory, also known as Bit BLT (i.e., bit block transfer), assumes that a source pitch and a destination pitch are equal when the source area and destination area overlap in the memory. It would be desirable to have a method to transfer image data between source and destination areas that arbitrarily overlap in a memory without any restrictions on the source pitch or the destination pitch.

SUMMARY OF THE INVENTION

The present invention concerns an apparatus including a first memory, a second memory, and a memory interface. The first memory may be configured to store an entire image. The second memory may be configured to store a portion of the image during an image processing operation. The memory interface may be configured to transfer the portion of the image (i) from a source area of the first memory to the second memory prior to the image processing operation and (ii) from the second memory to a destination area of the first memory following the image processing operation. The memory interface may be further configured to select from among four modes of transferring image data from the source area of the first memory and to the destination area of the first memory based upon how the source area and the destination area overlap in the first memory.

The objects, features and advantages of the present invention include providing a method and/or architecture to transfer image data between arbitrarily overlapping areas of memory that may (i) allow for arbitrarily overlapping of source and destination areas, (ii) support different source pitch and destination pitch, and/or (iii) support different numbers of bytes per pixel in source and destination areas.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
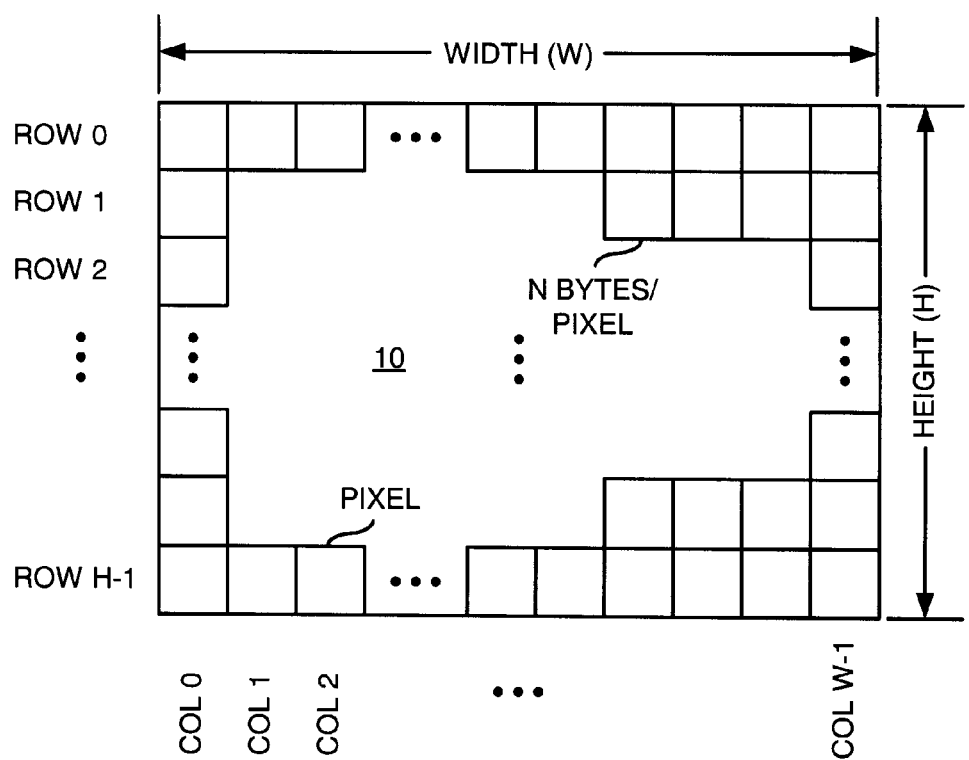
FIG. 1 is a diagram illustrating parameters of an image structure.

Referring to FIG. 1, a diagram is shown illustrating an example image. In digital image processing, an image 10 may be represented as a rectangular grid with each grid square representing 1 pixel (or picture element). The number of pixels in each horizontal row of the grid (e.g., W) is generally referred to as the Width. The number of pixels in each vertical column of the grid (e.g., H) is generally referred to as the Height. Each pixel may be represented, for example, with N bytes of data. N may be fixed for the entire image. For simplicity, an example where N equals 1 is used, unless otherwise indicated.

Figure 2:
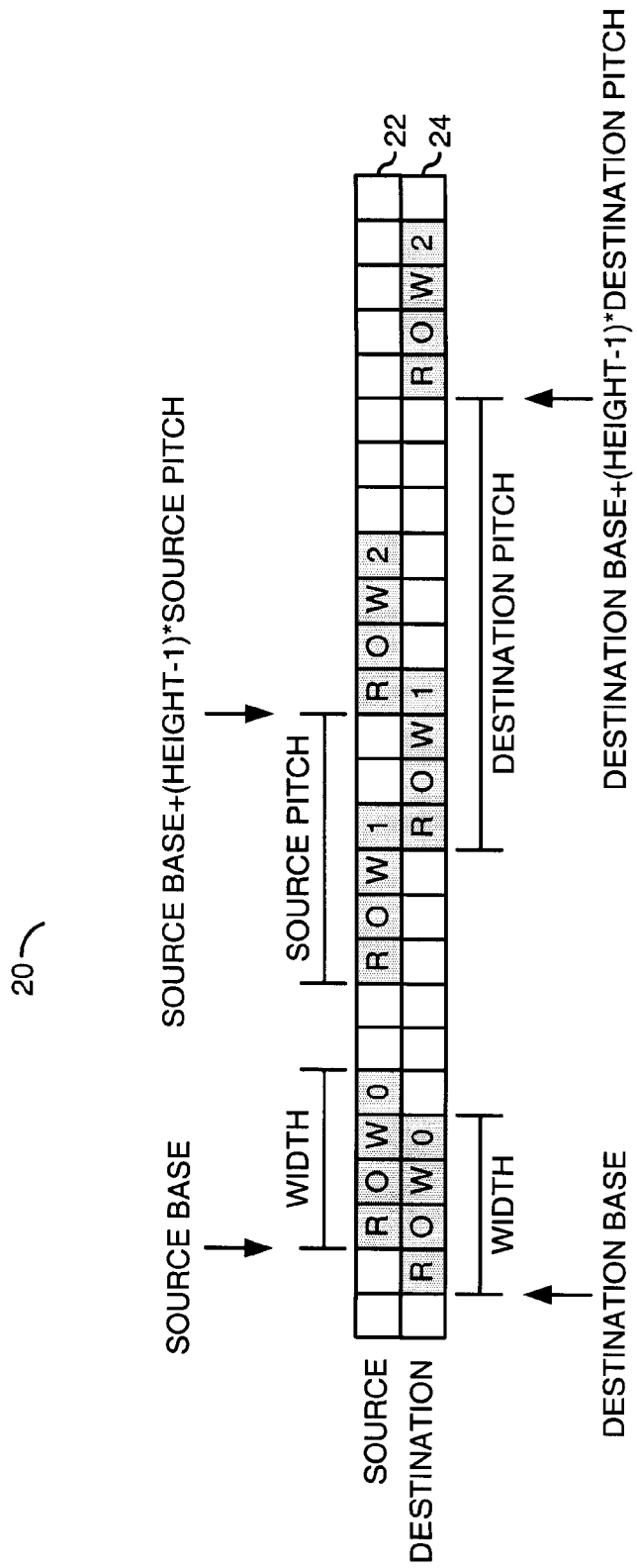
FIG. 2 is a diagram illustrating an example storage scheme with overlap between a source area and a destination area.

Referring to FIG. 2, a diagram is shown illustrating an example storage scheme 20. Each row of the image may be commonly stored in contiguous bytes of memory, while adjacent rows of the image may be separated by a number of bytes of memory. The number of bytes from the first pixel of a row to the first pixel of the next row is generally referred to as the Pitch. The address of the first pixel of the first row is generally referred to as the Base.

An image, which tends to occupy a very large area of memory, is generally stored in a larger, slower memory (e.g., dynamic random access memory, or DRAM). A portion of the larger, slower memory occupied by the image is generally known as the source area. Portions of the source area may be read into a smaller, faster memory (e.g., static random access memory, or SRAM), operated on, and then written back to a portion of the larger, slower memory generally known as the destination area. The source area and destination area may be the same or different portions of memory. Due to the large size of the image and the small size of the smaller, faster memory, the read, operate, write sequence is generally performed on small chunks of the image and iterated over the entire image.

The source area and the destination area may overlap arbitrarily in memory. Depending on how the source and destination areas overlap, the order of the data transfer from source to destination may be changed to prevent overwriting a chunk of the overlapping area that is to be, but has not yet been, read. In one example, a source area 22 may be overlapped by a destination area 24 (source area 22 and destination area 24 are illustrated as a top row and a bottom row, respectively, for clarity). The boxes represent a contiguous chunk of memory with addresses increasing from left to right. The top row illustrates the memory areas allocated to the source area 22, while the bottom row illustrates the memory areas allocated to the destination area 24. In one example, the respective parameters for the source and destination areas may be set according to values programmed into one or more registers. In the example illustrated in FIG. 2, Width equals 4, Height equals 3, Source Area Pitch equals 6, and Destination Area Pitch equals 10.

In one example, a starting address of the top row of the source may be greater than that of the destination (e.g., SourceBase>DestinationBase). The starting address of the bottom row of the source may be less than that of the destination (e.g., SourceBase+(Height−1)*SourcePitch<DestinationBase+(Height−1)*DestinationPitch). In such a case, the reads and writes may be performed in the following order to prevent overwriting:

read source row 0, write destination row 0;
read source row 2, write destination row 2;
read source row 1, write destination row 1.

In contrast to the conventional method, the method in accordance with embodiments of the present invention generally allows for arbitrarily overlapping source and destination areas. In general, the method in accordance with embodiments of the present invention generally supports different Source Pitch and Destination Pitch, and, therefore, may be more flexible than the traditional method. Different modes of the method in accordance with embodiments of the present invention will be explained in more detail below.

Figure 3:
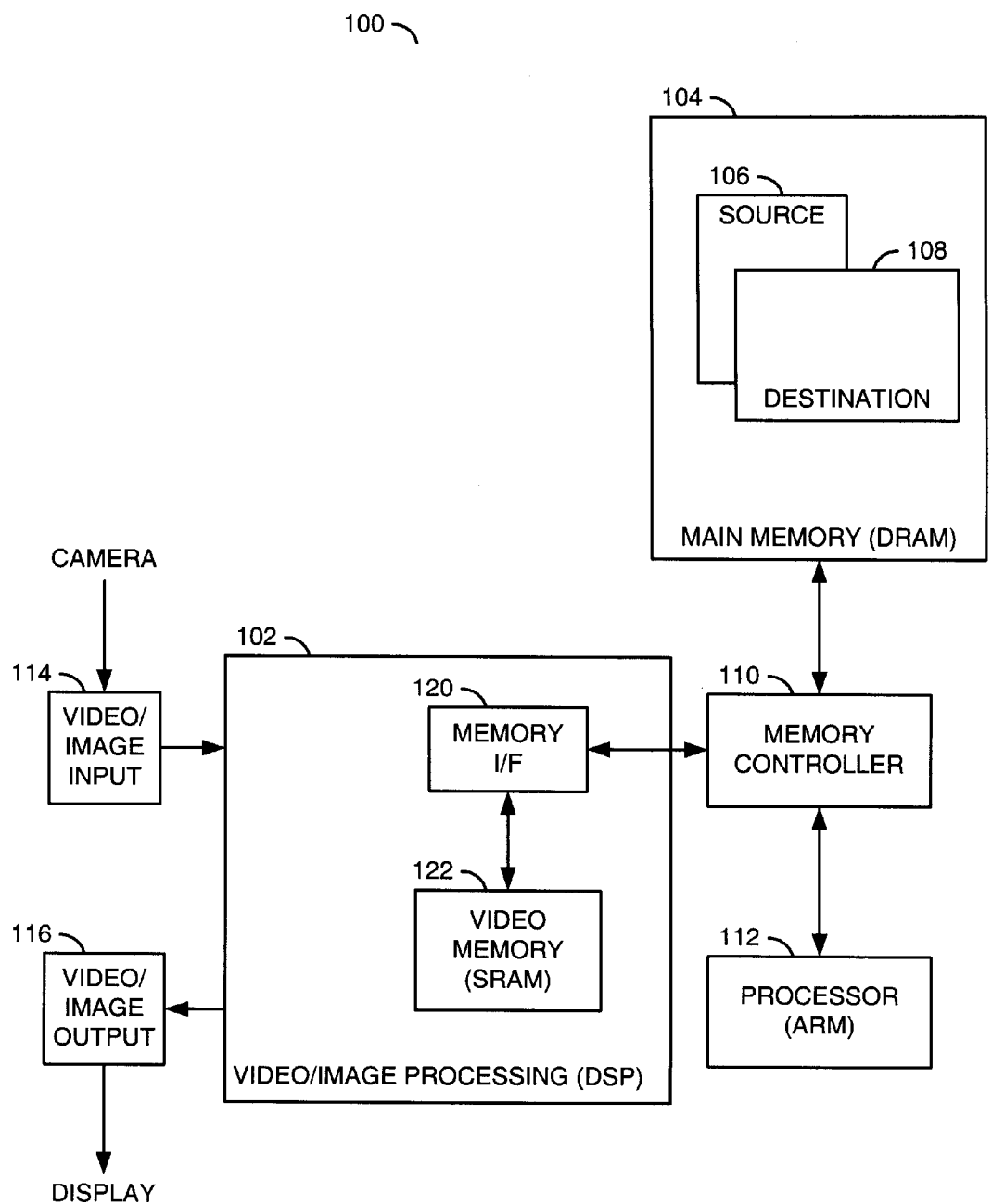
FIG. 3 is a block diagram illustrating an example system implementing a transfer scheme in accordance with an embodiment of the present invention.

Referring to FIG. 3, a block diagram is shown illustrating an example system 100 in accordance with a preferred embodiment of the present invention. In one example, the system 100 may comprise a block (or circuit) 102 and a block (or circuit) 104. The block 102 may be implemented, in one example, as a video/image processing module. In one example, the block 102 may comprise a digital signal processor (DSP). The block 102 may comprise, for example, as an application specific integrated circuit (ASIC). The block 104 may be implemented as a memory. In one example, the block 104 may comprise dynamic random access memory (DRAM).

The block 102 may be configured to read image information (e.g., pixels) from a source area 106 of the memory 104, perform one or more operations on the image information, and write the processed image information to a destination area 108 of the memory 104. The source area 106 and the destination area 108 may overlap arbitrarily in the memory 104. In one example, the block 102 and the block 104 may be coupled by a block 110. The block 110 may be implemented, in one example, as a memory controller. The block 102 may be configured to perform transfers to and from the block 104 using the block 110.

In one example, the system 100 may also include a processor 112. In one example, the processor 112 may comprise a general purpose processor (e.g., an ARM processor). The processor 112 maybe coupled to the memory controller 110 for access to the memory 104. In one example, the processor 112 may be configured (or programmed) to interact (or control) the block 102. The system 100 may also include a block (or circuit) 114 and a block (or circuit) 116. The block 114 may be implemented, for example, as a video/image input module. The block 116 may be implemented, for example, as a video/image output module.

In one example, an image may be obtained from a camera coupled to the video/image input block 114 and stored in the memory 104. The image stored in the memory 104 may be transferred between an internal memory of the block 102 and the memory 104, using the techniques described herein, for processing. Image data may be sent to a display coupled to the video/image output block 116.

In one example, the block 102 may comprise a block (or circuit) 120 and a block (or circuit) 122. The block 120 may be implemented, in one example, as a memory interface. The block 122 may be implemented, in one example, as a small, fast memory. For example, the memory 122 may be implemented as static random access memory (SRAM). The block 120 may be configured to read portions of an image from the source area 106 of the memory 104 into the memory 122 and write the portions of the image from the memory 122 to the destination area 108 of the memory 104 (e.g., using the memory controller 110). The block 102 may be configured to perform one or more operations (e.g., image processing, color correction, contrast enhancement, gamma correction, compression/decompression, alpha blending, etc.) on the portions of the image in the memory 122.

Figure 4:
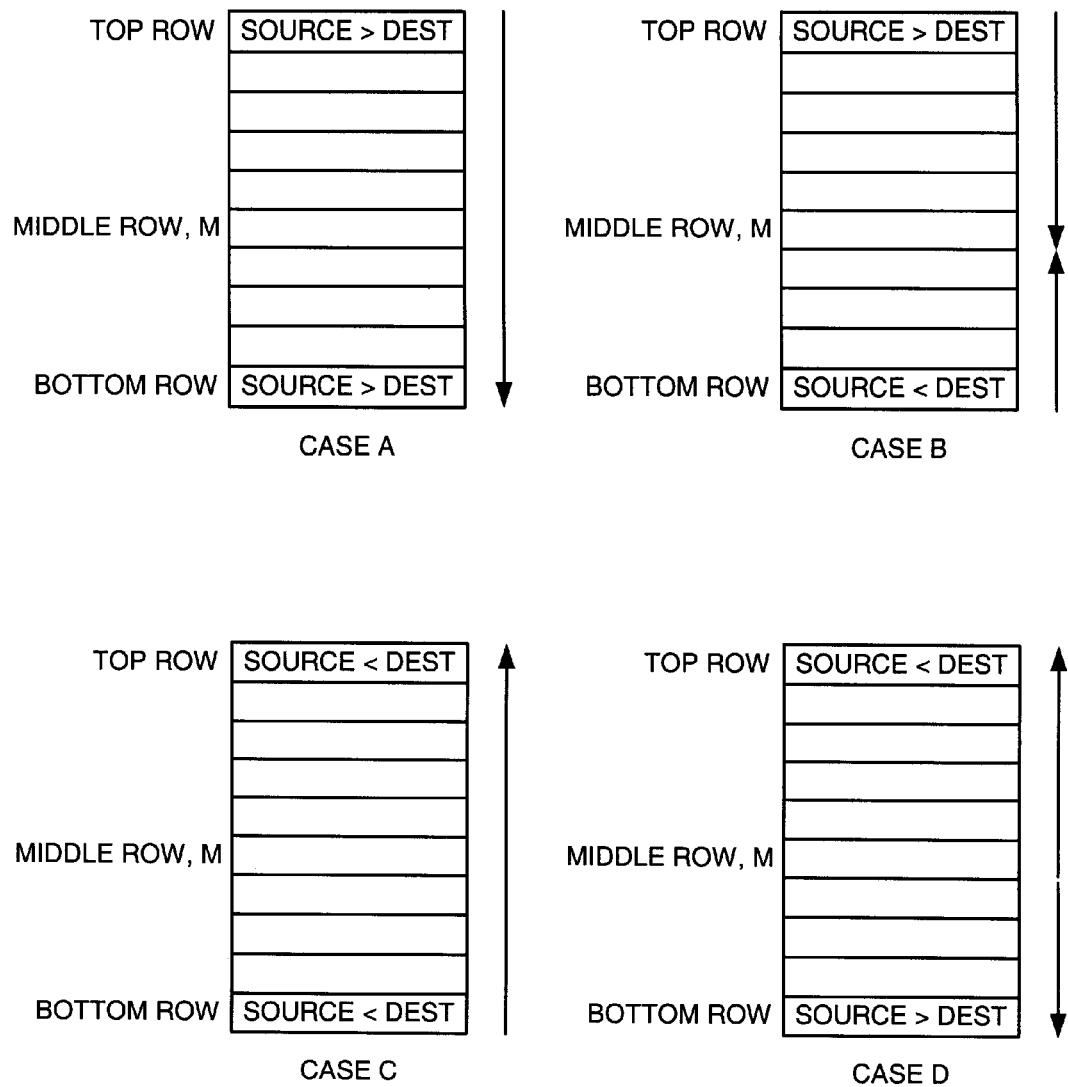
FIG. 4 is a diagram illustrating various transfer modes in accordance with an embodiment of the present invention.

Referring to FIG. 4, a diagram is shown illustrating various transfer modes in accordance with embodiments of the present invention. In one example, transfers from source areas to destination areas may be divided in four cases A-D. In each case, the image data to be transferred may be presented as a rectangular array divided into horizontal strips. Each horizontal strip represents one row of the image. However, the relative position of the horizontal strips, which are depicted as adjacent to one another, is for illustration purposes and does not necessarily represent the relative location of the rows of the image in physical memory. Case B generally involves transfers similar to the transfer described above in connection with FIG. 2. The > sign in the top row means the starting address of the top row of the source is greater than that of the destination (e.g., Source Base>Destination Base). The < sign in the bottom row means the starting address of the bottom row of the source is less than that of the destination (e.g., Source Base+(Height−1)*Source Pitch<Destination Base+ (Height−1)*Destination Pitch). The vertical arrows generally represent the order of reading/writing the source/destination rows.

In case A, data transfer generally starts at the top row and moves down the rows until Height rows have been transferred. In case C, data transfer generally starts at the bottom row and moves up the rows until Height rows have been transferred. In cases B and D, the selection of row order involves determination of some middle row (e.g., M) between the top and bottom rows. In case B, data transfer generally starts at the top row and moves down the rows until row M; data transfer then continues at the bottom row and moves up the rows until row M+1. In case D, data transfer generally starts at row M and moves up the rows until the top row; data transfer then continues at row M+1 and moves down the rows until the bottom row. The middle row, M, may be computed, in one example, using the following equation:

$$\text{Source Base} + M*\text{Source Pitch} = \text{Destination Base} + M*\text{Destination Pitch}.$$

Solving for M produces the following equation:

$$M = (\text{Destination Base} - \text{Source Base})/(\text{Source Pitch} - \text{Destination Pitch}).$$

In the conventional method of data transfer from source to destination area, also known as Bit BLT, the Source Pitch and Destination Pitch are equal when the source area and destination area overlap in memory. Thus, each pixel in the destination area is offset from the corresponding pixel in the source area by a fixed number of bytes, either positive or negative. The conventional method is therefore limited to case A (negative offset) and case C (positive offset) transfers. The method in accordance with the present invention generally supports different Source Pitch and Destination Pitch, which means that the offset need not be fixed. For example, the method in accordance with the present invention may perform transfers in cases A, B, C, and D.

If Width is greater than the size of the smaller, faster memory (e.g. SRAM), each row may be transferred in multiple data transfers. When the number of bytes per pixel, N, is the same for both source and destination areas, then within each row, the horizontal order is generally left-to-right (e.g., smaller to larger addresses) if the vertical order is top-to-bottom (e.g., moving down the rows); conversely, the horizontal order is generally right-to-left (e.g., larger to smaller addresses) if the vertical order is bottom-to-top (e.g., moving up the rows).

Figure 5:
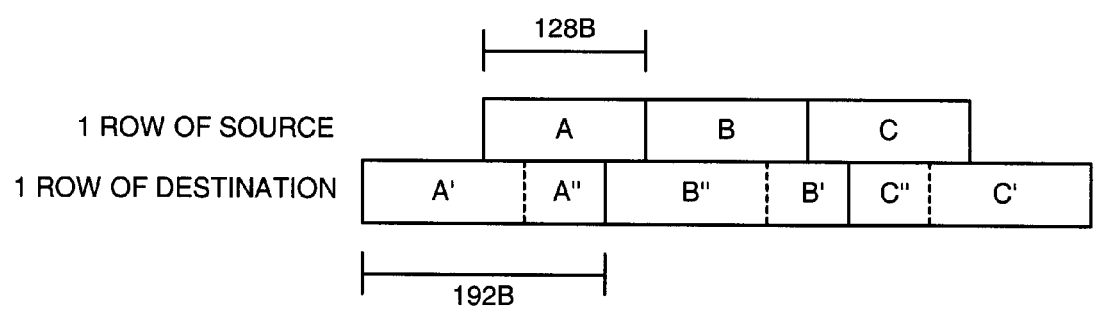
FIG. 5 is a diagram illustrating an example where the source area and the destination area have different numbers of bytes per pixel.

Referring to FIG. 5, a diagram is shown illustrating an example where the numbers of bytes per pixel are different for the source and destination areas. When the number of bytes per pixel for the source area (e.g. Source.N) is less than the number of bytes per pixel for the destination area (e.g., Destination.N), a row which has left-to-right horizontal order (>)

may have to switch to right-to-left horizontal order somewhere in the middle of the row to prevent overwriting of the source data. The switching of the horizontal order may be illustrated by an example in which the number of bytes per pixel of the source area is set to 2 (e.g., Source.N=2), the number of bytes per pixel of the destination area is set to 3 (e.g., Destination.N=3), and the maximum number of bytes per transfer (e.g., S) is 128 (e.g., S=128). For every 128 bytes of source data read, 192 bytes of destination data needs to be written.

To prevent overwriting, the read/write order for the row may be as follows:

read A (128 B), write A' (128 B), write A" (64 B),
read C (128 B), write C' (128 B),
read B (128 B), write B'C" (128 B), write B" (128 B).

Using Source.N=2, Destination.N=3, and S=128, the horizontal order within a row, R, also needs to be switched from left-to-right to right-to-left after a number of transfers, T, when:

$$(\text{Source Base} + R*\text{Source Pitch}) + T*S = (\text{Destination Base} + R*\text{Destination Pitch}) + T*(\text{Destination}.N/\text{Source}.N*S)$$ EQ. 1.

R generally represents the number of each row, which ranges from 0 (e.g., top row) up to and including HEIGHT-1 (e.g., bottom row). For each row of the image, T may be computed using the row number, R, in the Equation 1 above. When T is computed for a row, data transfer may begin for the row. If the horizontal order for the row is left-to-right, then after T transfers, the horizontal order for the remainder of the row is switched to right-to-left. If the entire row is transferred after fewer than T transfers, the horizontal order does not switch from left-to-right to right-to-left during the transfer of the row.

Conversely, when Source.N is greater than Destination.N, a row which has right-to-left horizontal order (<) may have to switch to left-to-right horizontal order somewhere in the middle of the row to prevent overwriting of source data. The horizontal order within a row, R, is switched from right-to-left to left-to-right after a number of transfers, T, when:

$$(\text{Source Base} + R*\text{Source Pitch}) + (\text{Source}.N/\text{Destination}.N*S) = (\text{Destination Base} + R*\text{Destination Pitch}) + T*S,$$ Eq. 2.

For each row of the image, T may be computed by using the row number, R, in Equation 2 above. When T is computed for a row, data transfer may begin for the row. If the horizontal order for the row is right-to-left, then after T transfers, the horizontal order for the remainder of this row may be switched to left-to-right. If the entire row is transferred after fewer than T transfers, the horizontal order does not switch from right-to-left to left-to-right during the transfer of the row.

Figure 6:
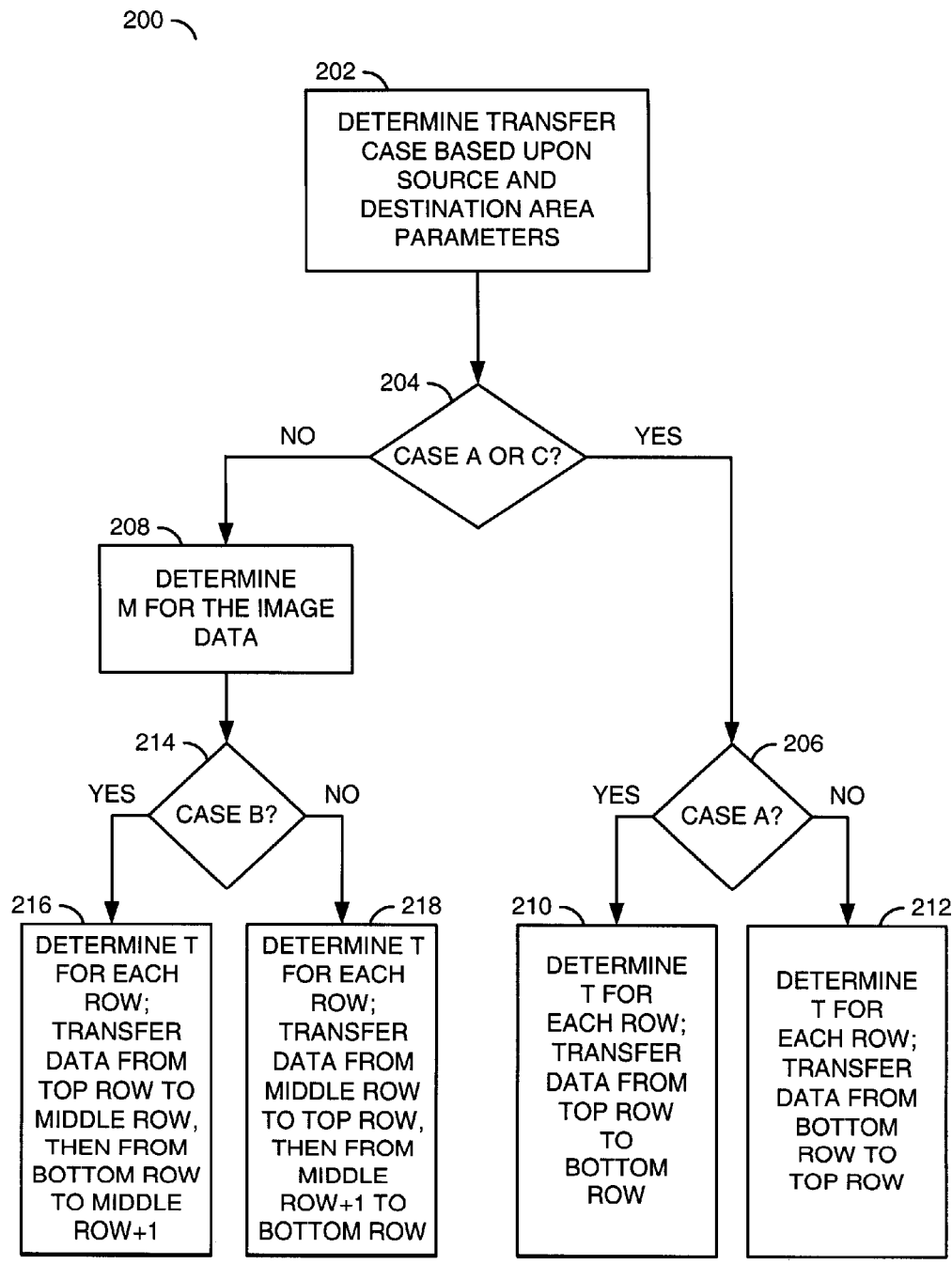
FIG. 6 is a flow diagram illustrating a method to transfer image data between arbitrarily overlapping areas of memory in accordance with an embodiment of the present invention.

Referring to FIG. 6, a flow diagram is shown illustrating a method 200 to transfer image data between arbitrarily overlapping areas of memory in accordance with an embodiment of the present invention. The method (or process) 200 may comprise a step (or block) 202, a step (or block) 204, a step (or block) 206, a step (or block) 208, a step (or block) 210, a step (or block) 212, a step (or block) 214, a step (or block) 216, a step (or block) 218. In the step 202, the process 200 determines whether a transfer is to be made according to case A, case B, case C, or case D. The determination is generally based upon parameters (base, pitch, number of bytes per pixel, etc.) of the source area and the destination area. In the step 204, the process 200 checks whether case A or C have been selected in step 202. If case A or C are selected, the process 200 may move to the step 206. If case A or C have not be selected, the process 200 may move to the step 208.

In the step 206, the process 200 checks whether case A or case C were selected. If case A was selected, the process 200 may move to the step 210. If case C was selected, the process 200 may move to the step 212. In the step 210, the process 200 may determine the value T, which represents the number of transfers after which the horizontal row order should be switched, for each row R of the image and transfer data starting at the top row of the image and moving down until a number of rows equal to the height of the image have been transferred. In the step 212, the process 200 may determine the value T, which represents the number of transfers after which the horizontal row order should be switched, for each row R of the image and transfer data starting at the bottom row and moving up the rows until the number of rows equal to the height of the image have been transferred.

In the step 208, the process 200 may determine a value M representing a middle row of the image. After the value M is determined, the process 200 may move to the step 214. In the step 214, the process 200 may check whether case B or case D have been selected. If case B was selected, the process 200 may move to the step 216. If case D was selected, the process 200 may move to the step 218.

In the step 216, the process 200 may determine the value T, which represents the number of transfers after which the horizontal row order should be switched, for each row R of the image and transfers data starting at the top row and moving down until the middle row has been transferred. The process 200 then transfers data starting at the bottom row and moving up until the remaining rows have been transferred. In the step 218, the process 200 may determine the value T, which represents the number of transfers after which the horizontal row order should be switched, for each row R of the image and transfers data starting at the middle row and moving up until the top row has been transferred. The process 200 then transfers data starting at the row M+1 and moving down until the bottom row has been transferred.

As would be apparent to those skilled in the relevant art(s), the signals illustrated in FIG. 3 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s).

The functions illustrated by the diagrams of FIGS. 3 and 6 may be implemented using one or more of a conventional general purpose processor, digital computer, microprocessor, microcontroller, RISC (reduced instruction set computer) processor, CISC (complex instruction set computer) processor, SIND (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first memory configured to store an entire image;
   a second memory configured to store a portion of said image during an image processing operation; and
   a memory interface configured to transfer said portion of said image (i) from a source area of said first memory to said second memory prior to said image processing operation and (ii) from said second memory to a destination area of said first memory following said image processing operation, wherein (A) said memory interface is further configured to select from among four modes of transferring image data from said source area of said first memory and to said destination area of said first memory based upon how said source area and said destination area overlap in said first memory and (B) at least one of said four modes determines a middle row of said image and row orders of transfers between said first and said second memories are determined based upon a position of a row being transferred relative to said middle row.

2. The apparatus according to claim 1, wherein said first memory comprises dynamic random access memory (DRAM) and said second memory comprises static random access memory (SRAM).

3. The apparatus according to claim 1, wherein said source area has a first pitch and said destination has a second pitch.

4. The apparatus according to claim 1, wherein an image processing operation changes a number of bytes per pixel of said image.

5. The apparatus according to claim 1, wherein:
   a first mode comprises transferring data starting at a top row and moving down until a number of rows equal to a height of the image have been transferred;
   a second mode comprises transferring data starting at a bottom row and moving up the rows until the number of rows equal to a height of the image have been transferred;
   a third mode comprises determining a middle row between the top and the bottom rows, transferring data starting at the top row and moving down until the middle row has been transferred, and transferring data starting at the bottom row and moving up until the remaining rows have been transferred; and
   a fourth mode comprises determining the middle row between the top and the bottom rows, transferring data starting at the middle row and moving up until the top row has been transferred, and transferring data starting at the row immediately following the middle row and moving down until the bottom row has been transferred.

6. The apparatus according to claim 1, wherein said first memory is on a separate integrated circuit from said second memory and said memory interface.

7. An apparatus comprising:
   a first memory configured to store an entire image;
   a second memory configured to store a portion of said image during an image processing operation; and
   a memory interface configured to transfer said portion of said image (i) from a source area of said first memory to said second memory prior to said image processing operation and (ii) from said second memory to a destination area of said first memory following said image processing operation, wherein (A) said memory interface is further configured to select from among four modes of transferring image data from said source area of said first memory and to said destination area of said first memory based upon how said source area and said destination area overlap in said first memory and (B) at least one of said four modes switches a horizontal order of a transfer mid row when a number of bytes per pixel is different between said source area and said destination area.

8. The apparatus according to claim 7, wherein at least one of said four modes determines a middle row of said image and row orders of transfers between said first and said second memories are determined based upon a position of a row being transferred relative to said middle row.

9. The apparatus according to claim 8, wherein said middle row is determine based on a ratio of (i) a difference between a base of the destination area and a base of the source area and (ii) a difference between a pitch of the source area and a pitch of the destination area.

10. The apparatus according to claim 7, wherein at least one of said four modes is configured such that the horizontal order within a row is switched after a predetermined number of transfers when the starting address of the row of said source area is greater than the starting address of the same row of said destination area but the ending address of the same row of said source area is less than the ending address of the same row of said destination area, or when the starting address of the row of said source area is less than the starting address of the same row of said destination area but the ending address of the same row of said source area is greater than the ending address of the same row of said destination area.

11. A method to transfer image data between arbitrarily overlapping areas of memory comprising:
    storing an entire image in a first memory;
    reading a portion of said image from a source area of said first memory to a second memory;
    performing an image processing operation; and
    writing said portion of said image from said second memory to a destination area of said first memory by selecting from among four modes of transferring image data from said source area of said first memory and to said destination area of said first memory based upon how said source area and said destination overlap in said first memory, wherein at least one of said four modes determines a middle row of said image and row orders of transfers between said first and said second memories are determined based upon a position of a row being transferred relative to said middle row.

12. The method according to claim 11, wherein said first memory comprises dynamic random access memory (DRAM) and said second memory comprises static random access memory (SRAM).

13. The method according to claim 11, wherein said source area has a first pitch and said destination has a second pitch.

14. The method according to claim 11, wherein said image processing operation changes a number of bytes per pixel of said image.

15. The method according to claim 11, further comprising:
    determining said middle row based on a ratio of (i) a difference between a base of the destination area and a base of the source area and (ii) a difference between a pitch of the source area and a pitch of the destination area.

16. The method according to claim 11, wherein at least one of said four modes comprises switching a horizontal order of a transfer mid row when a number of bytes per pixel is different between said source area and said destination area.

17. The method according to claim 16, wherein at least one of said four modes is configured such that the horizontal order within a row is switched after a predetermined number of transfers when the starting address of the row of said source area is greater than the starting address of the same row of said destination area but the ending address of the same row of said source area is less than the ending address of the same row of said destination area, or when the starting address of the row of said source area is less than the starting address of the same row of said destination area but the ending address of the same row of said source area is greater than the ending address of the same row of said destination area.

18. The method according to claim 11, wherein:
    a first mode comprises transferring data starting at a top row and moving down until a number of rows equal to a height of the image have been transferred;
    a second mode comprises transferring data starting at a bottom row and moving up the rows until the number of rows equal to a height of the image have been transferred;
    a third mode comprises determining a middle row between the top and the bottom rows, transferring data starting at the top row and moving down until the middle row has been transferred, and transferring data starting at the bottom row and moving up until the remaining rows have been transferred; and
    a fourth mode comprises determining the middle row between the top and the bottom rows, transferring data starting at the middle row and moving up until the top row has been transferred, and transferring data starting at the row immediately following the middle row and moving down until the bottom row has been transferred.

* * * * *